United States Patent

Jones

Patent Number: 5,715,627
Date of Patent: Feb. 10, 1998

[54] NATURAL ROCK FISHING LURE

[76] Inventor: Phillip Jones, 55 W. Main Box 502, Ferron, Utah 84523

[21] Appl. No.: 548,008

[22] Filed: Oct. 25, 1995

[51] Int. Cl.$^6$ .......................................... A01K 85/00
[52] U.S. Cl. ........................... 43/42.34; 43/42; 43/42.45
[58] Field of Search ................ 43/42, 42.39, 42.32, 43/42.34, 42.45, 43.12, 42.5; 63/23, DIG. 1; D11/86, 87

[56] References Cited

U.S. PATENT DOCUMENTS

| | | | |
|---|---|---|---|
| 1,074,673 | 10/1913 | Weiss | 63/33 |
| 1,444,338 | 2/1923 | Doering | 43/42.32 |
| 2,440,989 | 5/1948 | Brunt | 43/43.15 |
| 3,346,986 | 10/1967 | Tiikkainen | 43/43.12 |
| 3,426,469 | 2/1969 | Lee | 43/43.12 |
| 3,513,583 | 5/1970 | Leash et al. | 43/43.12 |
| 3,685,196 | 8/1972 | Scott | 43/43.12 |
| 4,638,587 | 1/1987 | Koch | 43/43.12 |
| 4,785,570 | 11/1988 | Koch | 43/43.12 |
| 5,131,181 | 7/1992 | Steinke | 43/42.28 |

OTHER PUBLICATIONS

Jewelers' Circular–Keystone, 'The Mart', Apr. 1987, Agate Pendant, p. 38.

"As Lead Sinkers Drop In Favor, Weigh Alternatives Such As Rocks", Washington Times, Jan. 25, 1993.

Primary Examiner—Joseph J. Hail, III
Attorney, Agent, or Firm—Mallinckrodt & Mallinckrodt

[57] ABSTRACT

A fishing lure comprises a natural stone as a lure body and has fracture surfaces randomly oriented. Preferably a pair of fishing hook and fishing line attachment fittings are securely fastened to opposite ends of the lure body, and a feather may be optionally glued to the lure body.

2 Claims, 1 Drawing Sheet

NATURAL ROCK FISHING LURE

BACKGROUND OF THE INVENTION

1. Field

This invention is in the field of fishing lures primarily for sport fishing.

2. State of the Art

Fishing has long been a major sport for individuals throughout the world and considerable ingenuity has been used in the making of a wide variety of lures to attract fish which are caught by a hook at the end of a fish line extending from a fishing pole; yet, persons intrigued by the thought of catching fish constantly seek newer forms of lures that they hope will increase their chances.

SUMMARY OF THE INVENTION

In accordance with the invention I have produced a new and different fishing lure constituting, as the lure body, a piece of natural rock having fracture surfaces that are randomly oriented so as to present a constantly changing pattern of motion or light reflection relative to other similarly constituted lures, thereby enabling a fisherman to select different lures from a group of such lures during the course of fishing, with the expectation that a selected one may work better in a given situation than the last tried.

My fishing lure is produced by percussion, usually by applying hammer-like blows to a natural rock or piece of rock in a random manner so the surface of the rock is sculptured. Rock or rock pieces of suitable size and condition may also be found in nature and used as found for the fishing lure body.

Many kinds of rock can be used to produce the lure body. I prefer to use various rock of siliceous type, such as flint or chert, which break with a conchoidal fracture and provide more or less light reflective, percussive fracture surfaces at random. Other rocks of igneous type, such as obsidian and other glassy rocks, or of metamorphic type, which often contain quartz or other mineral in their make-up, may be used. Means, such as fittings, for the attachment of one or more usual fish hooks, leader line, or the end of a fish line to the lure body, are securely fastened to the lure body, for example, at its opposite ends.

THE DRAWING

Illustrated in the accompanying drawing is an embodiment of the invention constituting what I presently contemplate to be the best mode of carrying out the invention in actual practice.

In the drawing:

FIG. 1 represents a full face elevational view of the fishing lure constituting a piece of rock sculptured, either naturally or by hammer-like blows, as the lure body and equipped with a fitting at its upper end for the attachment of a usual leader or end of a fish line and with a similar fitting at its lower end for the attachment of a usual fish hook;

FIG. 2, a left-side elevational view of the fish lure of FIG. 1, with the fish hook shown in the same orientation;

FIG. 3, a right-side elevational view of the fishing lure of FIG. 1, with the fish hook shown in reverse orientation;

FIG. 4, a top plan view of the fishing lure of FIG. 1, with the fish hook oriented toward the front; and FIG. 5, a bottom plan view of the fishing lure of FIG. 1.

DETAILED DESCRIPTION OF THE ILLUSTRATED EMBODIMENT

In the illustrated embodiment, a fishing lure body 10 of natural stone is shown as being broad relatively to its thickness with mutually opposite, broad surfaces 11 and 12, respectively, and upper and lower ends 13 and 14, respectively. The surfaces 11 and 12 may themselves be entirely fracture surfaces, as when the entire body is a suitably sized chip from a larger rock or rock piece, or may be a rock or piece of rock whose surface is sculptured by chipping or otherwise to produce randomly oriented fractures, for example, conchoidal fractures such as indicated at 10a and 10b. However, the piece of rock could be of suitable size and have fractured surfaces as found in nature for direct use as a lure body. In most instances the fracture surfaces will be more or less light reflective and will include a variety of colors.

Sculpturing of a rock or piece of rock is accomplished by percussion, preferably by directing hammer-like blows against the exposed surfaces of the natural rock or piece of rock to result in random fracturing.

While the shape of the lure body is preferably in general as illustrated, it may have different shapes geometrically.

Figure 3:
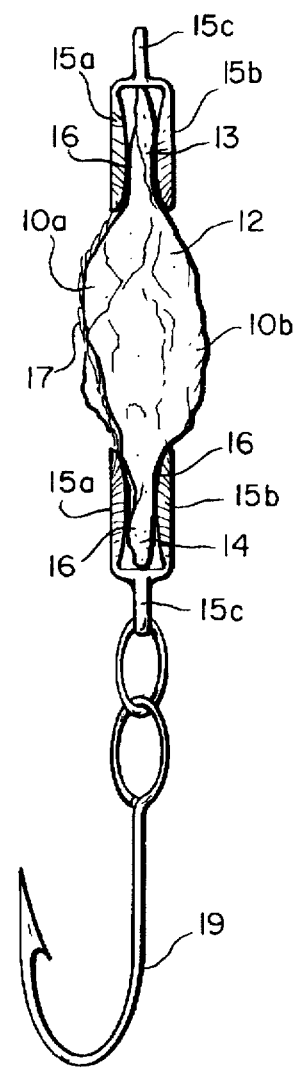
Figure 5:
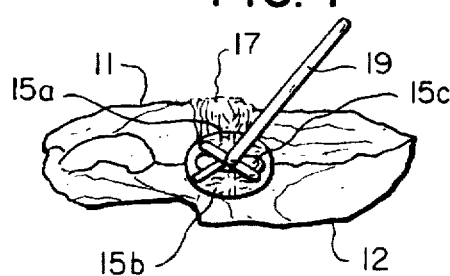

The lure body is provided with attachment means for the usual fish hooks, leader, or fish line, as a commercial fishing lure to be produced for use or sale as such. The attachment means can be of any type found suitable for secure fastening to the lure body, usually at opposite ends thereof. Thus, as shown, at each of the upper and lower ends 13 and 14 of the lure body 10 is a clamping jaw-type fitting 15, here having a pair of clamping jaw members 15a and 15b extending from a closed loop member 15c to encompass the corresponding end of the lure body 10 and being securely fastened thereto as by the application of a suitable adhesive 16, FIG. 3, such as an epoxy, or by a pin 17, FIG. 1, passing through the clamping jaws and the lure body, or by both glue and pin.

Figure 4:
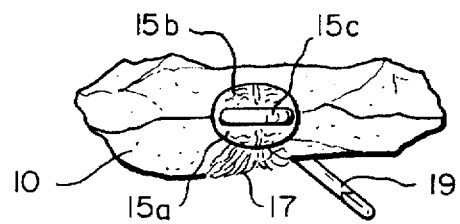
Figure 2:
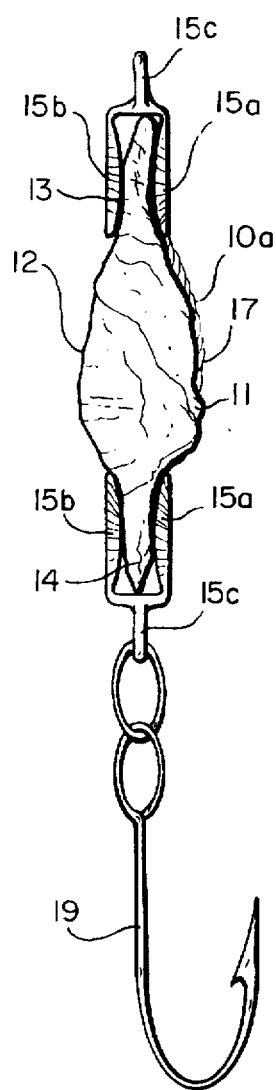
Figure 1:
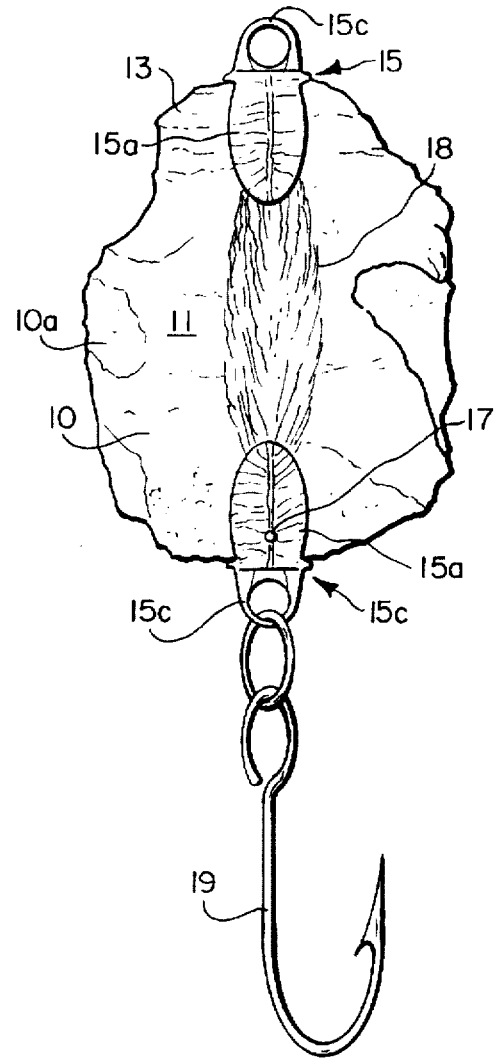

An optional feature of the invention is the gluing, preferably flatwise, of a small feather or part of a feather to the fractured surface of the lure body, usually but not necessarily downwardly from the upper end thereof as shown at 18, FIG. 1.

A usual leader or end of a usual fish line (not shown) will be attached as by tying to the loop member 15c of the upper fitting 15 and a fishing hook 19 in usual manner to loop member 15c of the lower fitting 15.

The fracture surfaces are conchoidal in certain sedimentary rocks such as flint or chert, which are preferred in the making of the lure bodies, but may be otherwise. They are preferably more or less light reflective, preferably more than less, with respect to the many different colors or combination of colors found in many rocks.

Although lures of the invention with lure bodies that are broad and relatively thin from a geometric standpoint are preferred as usually being more effective than other shapes, easier to produce, often as chips themselves resulting from percussive blows applied to a rock of relatively large size, and easier to package, other geometric shapes, such as a variety of geometric solids, may be used.

Whereas this invention is here illustrated and described with reference to an embodiment thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. A fishing lure comprising a lure body of natural stone having opposite ends and exposed fracture surfaces randomly arranged therebetween; and attachment means, for fish hook or hooks and for leader or fish line, securely fastened to said lure body and comprising a closed loop fitting at one of said ends of the lure body and a closed loop fitting at the other of said ends of the lure body, each of said attachment means further comprising a pair of clamping jaw members extending from said closed loop fitting and encompassing the corresponding end of the lure body, and means securely fastening the jaw members to the corresponding end of the lure body, said fastening means each comprising a pin passing through said pair of jaw members and the corresponding end of the lure body.

2. A fishing lure comprising a lure body of natural stone having exposed fracture surfaces randomly arranged; and attachment means for fish hook or hooks, for leader, or for fish line and securely fastened to said lure body, wherein a feather is glued to an exposed surface of the lure body.

* * * * *